United States Patent [19]

Larsen

[11] Patent Number: 5,709,967
[45] Date of Patent: Jan. 20, 1998

[54] SEALANT COMPOSITION, CELL AND BATTERY COVER, AND CELL BATTERY PREPARED THEREWITH

[75] Inventor: Steven R. Larsen, Oakdale, Minn.

[73] Assignee: GNB Technologies, Inc., Mendota Heights, Minn.

[21] Appl. No.: 745,453

[22] Filed: Nov. 12, 1996

[51] Int. Cl.$^6$ ................................... H01M 2/04
[52] U.S. Cl. .................. 429/175; 429/184; 429/186; 29/623.2
[58] Field of Search .................. 429/175, 174, 429/176, 185, 186, 178, 179, 180, 181, 184; 29/623.1, 623.2

[56] References Cited

U.S. PATENT DOCUMENTS

| | | | |
|---|---|---|---|
| 4,049,844 | 9/1977 | Bolon et al. | 427/54 |
| 4,052,549 | 10/1977 | Booth | 526/237 |
| 4,172,163 | 10/1979 | Magnotta | 428/40 |
| 4,217,263 | 8/1980 | Magnotta | 260/29.8 |
| 4,313,986 | 2/1982 | Magnotta | 428/40 |
| 4,521,500 | 6/1985 | Watanabe | 429/174 |
| 4,657,958 | 4/1987 | Fieldhouse et al. | 524/247 |
| 4,833,049 | 5/1989 | Teaford et al. | 429/181 |
| 4,839,422 | 6/1989 | McElroth et al. | 525/74 |
| 5,182,178 | 1/1993 | Brizendine et al. | 429/160 |
| 5,332,465 | 7/1994 | Kuzmik et al. | 156/628 |
| 5,332,633 | 7/1994 | Adamson et al. | 429/174 |
| 5,486,431 | 1/1996 | Tuttle et al. | 429/66 |

*Primary Examiner*—M. Nuzzolillo
*Attorney, Agent, or Firm*—Leydig, Voit & Mayer, Ltd.

[57] ABSTRACT

Disclosed are curable sealant compositions for coating a conductive bushing for a lead-acid cell or battery having positive and negative plates disposed within a container and a cover, the conductive bushing being molded into the cover and providing electrical communication with at least one of the plates, the bushing presenting an interface with the exterior of the bushing and the cover. The sealant compositions comprise a sealing elastomer in an amount from about 1% to about 15% by weight and a solvent in an amount of up to about 99% by weight. In accordance with the invention, the sealant composition is a terpene solvent, preferably a cyclic terpene and more preferably D-limonene. The sealant compositions preferably further comprise a reinforcing agent in an amount of about 1% to about 15% by weight. In use, at least a portion of a bushing is coated with the sealant composition, and the sealant composition is cured. The bushing is insert-molded within a nonconductive plastic substrate to form a cover for a battery or cell, such that the sealing elastomer seals the interface between the bushing and the substrate.

11 Claims, 1 Drawing Sheet

5,709,967

SEALANT COMPOSITION, CELL AND BATTERY COVER, AND CELL BATTERY PREPARED THEREWITH

TECHNICAL FIELD OF THE INVENTION

The present invention relates to electrochemical cells and batteries, particularly lead-acid cells and batteries, and more particularly to a sealant composition for effectively sealing the interference between the terminal bushings of a cell or battery and the cover of the cell or battery.

BACKGROUND OF THE INVENTION

Lead-acid cells and batteries include sulfuric acid as an electrolyte. This electrolyte readily wets the surfaces of internal lead components of the battery or cell, inasmuch as sulfuric acid has a very low surface tension. Sulfuric acid and can readily pass through small orifices and cracks. Without an effective seal between the interior of the battery or cell and the ambient atmosphere, sulfuric acid would readily migrate out to the environment, potentially causing corrosion of the terminals or exterior equipment. A seal also is necessary to prevent gases, such as oxygen or hydrogen, from leaking into or out of the battery or cell. It is particularly important to prevent oxygen from leaking into valve-regulated lead-acid (VRLA) batteries. Oxygen will cause a VRLA battery to prematurely discharge, thus preventing the battery from maintaining capacity during its life.

Leakage is of particular concern at the terminals of the battery or cell. Typically, the terminals electrically communicate with the lead plates of the battery or cell via conductive lead bushings, which are insert-molded within a non-conductive substrate forming a wall for the battery or cell. Lead electrode plates typically include lead posts extending therefrom towards the wall of the battery. These posts mateably engage the bushings to thereby communicate electrically with terminals at the exterior of the battery. This may be accomplished by a variety of cell constructions for the bushings and terminals. For example, in some batteries and cells, the posts extend through the bushings and through the cover of the battery. The exterior ends of the posts are welded to the terminal bushings to form terminals. In other cells and batteries, the bushing engages the lead post entirely within the cell or battery. The bushing is provided with a conductive extension arm that extends through the battery and has an exterior end that forms a terminal. In still other cells and batteries, the bushing extends partially through the substrate, and the exterior of the bushing is exposed. The terminal comprises a conductive element that is welded to the top of the bushing. In all of the foregoing cells and batteries, leakage may occur at the interface between the bushing and the nonconductive plastic wall if this interface is not properly sealed.

Inasmuch as the conductive bushing and nonconductive substrate are of dissimilar materials, it can be difficult to form an effective seal between the connector and partition wall. It is particularly difficult to form an effective seal between a conductive terminal bushing, which typically is made of lead (or a lead alloy), to a nonconductive substrate, which typically is made of an organic polymer, such as plastic. This problem is exacerbated when the battery is thermally cycled, such as, for example, in the case of an automotive battery. It can be expected that an automotive battery will be exposed to an annual temperature cycle ranging from below −30° F. in cold months to an underhood temperature of over 200° F. in hot months. This temperature cycling will cause the materials in the battery to expand and contract repeatedly. Because the bushing and partition will expand thermally with different coefficients of expansion, there is a tendency for the lead connectors to separate from the plastic wall, thus allowing for electrolyte creepage at the substrate-bushing interface and for gas transfer through the wall seal area. A sealant thus must effectively withstand interfacial forces caused by the repeated differential expansion and contraction of the terminal bushing and partition wall.

The prior art has provided a number of sealant compositions for lead-acid batteries that provide satisfactory sealant coatings. Sealant compositions typically comprise a sealing elastomer, such as, for example, polyisobutylene, dissolved in a solvent. Typically, the sealant composition includes polyisobutylene and a reinforcing agent, such as wood rosin, in a chlorinated solvent. In application, the exterior of the bushing is partially coated with the sealant composition, which is cured to leave a sealant coating on the bushing. A cover, such as a top or side wall, is formed by insert-molding the coated bushing within a plastic partition wall, such that the sealant makes sealing contact at the interface between the bushing and the plastic wall. Known polyisobutylene/rosin sealants are believed to be effective for use in lead-acid batteries and cells.

A principal drawback in the use of polyisobutylene/rosin sealants is the difficulty of dissolving these components to form a sealant composition for application of the sealant. Among known chemicals, chlorinated solvents are generally considered to be by far the most effective in forming a sealant composition with polyisobutylene and wood rosin. Indeed, insofar as is known, trichloroethylene is the only solvent presently commercially used to prepare polyisobutylene/rosin sealant compositions. However, trichloroethylene is undesirable in many respects. Trichloroethylene is a highly toxic chemical. It is believed to cause long-term adverse health problems, and further is suspected of being carcinogenic to humans. Because of these concerns, special precautions must be taken when handling trichloroethylene. In addition, because trichloroethylene is a chlorocarbon, its use is strongly discouraged for environmental reasons. For example, chlorocarbons are believed to contribute to the depletion of atmospheric ozone, and are known to poison ground water supplies.

Notwithstanding these severe disadvantages, trichloroethylene remains the predominant solvent currently in commercial use, because of the difficulties in providing another solvent suitable for use in dissolving polyisobutylene and wood rosin. Many parameters dictate the choice of solvent in a sealant composition. To be suitable, a solvent should be a non-chlorinated, non-fluorinated chemical, and should be non-toxic. The solvent further should have no adverse environmental effects, thus allowing for use and disposal of the solvent without the safety precautions necessary with the use of trichloroethylene. In addition, the solvent should be at least as effective as trichloroethylene in dissolving a sealing elastomer such as polyisobutylene, and should have a sufficient volatility that it may be substantially completely evaporated to leave a sealant coating on an applied substrate upon curing of the sealant composition. The solvent further should have a low flammability. Most ideally, the solvent also should be readily commercially available at modest cost. The solvent further should be completely compatible with existing battery production processes. These considerations have provided an unresolved need in the art for a non-hazardous, environmentally safe sealant composition having a low flammability.

It is a general object of the invention to provide a sealant composition for a lead-acid battery, wherein the sealant composition does not include trichloroethylene.

It is a further general object to provide a sealant composition having a non-toxic, non-fluorinated, non-chlorinated solvent.

Another general object is to provide a sealant composition including a solvent that is environmentally safe.

A further object is to provide a sealant composition of low flammability that cures to leave a sealant that is stable when in contact with sulfuric acid.

A further general object is to provide a method for making a battery terminal bushing including a sealant.

Another general object is to provide a method for making a battery cover having at least two bushings disposed within a nonconductive substrate and extending therethrough for providing electrical communication through the container wall, the method including a step of coating at least a portion of the exterior of a terminal bushing with a non-toxic, non-chlorinated, environmentally safe sealant composition to seal the interface between the bushing and the substrate. More generally, it is an object of the invention to provide a method for making a battery that is sealed without the use of a chlorinated sealant composition.

SUMMARY OF THE INVENTION

Surprising, it has been discovered that terpene solvents, such as cyclic terpenes and particularly D-limonene, function effectively as solvents for sealing elastomers such as polyisobutylene. D-limonene is a chemical that is used in the food industry, and its application in the battery industry is not believed to be contemplated by the prior art. In accordance with the invention, a curable sealant composition comprising a terpene solvent and a sealing elastomer dissolved therein is provided. The sealing elastomer preferably is polyisobutylene, and the solvent preferably is D-limonene. In a preferred embodiment, a reinforcing agent is added to the composition in an amount effective to reinforce the sealing elastomer upon curing of the sealant composition. For example, the reinforcing agent may be a rosin, such as wood rosin or gum rosin. The sealant composition may include other ingredients, such as, for example, colorants.

The invention also encompasses a method of imparting a bushing with a coating of a sealant, including the steps of providing a conductive bushing, coating at least a portion of the exterior of the bushing with a sealant composition which comprises a sealing elastomer dissolved within a terpene solvent, and curing the sealant composition. In accordance with the invention, a cover for a battery or cell is formed by insert-molding first and second bushings within a nonconductive substrate such that the sealing elastomer forms a seal at the interfaces between the bushings and the nonconductive substrate that forms the battery cover. A cell and battery and methods for making a cell and battery also fall within the scope of the present invention.

DETAILED DESCRIPTION OF THE INVENTION

Figure 2:
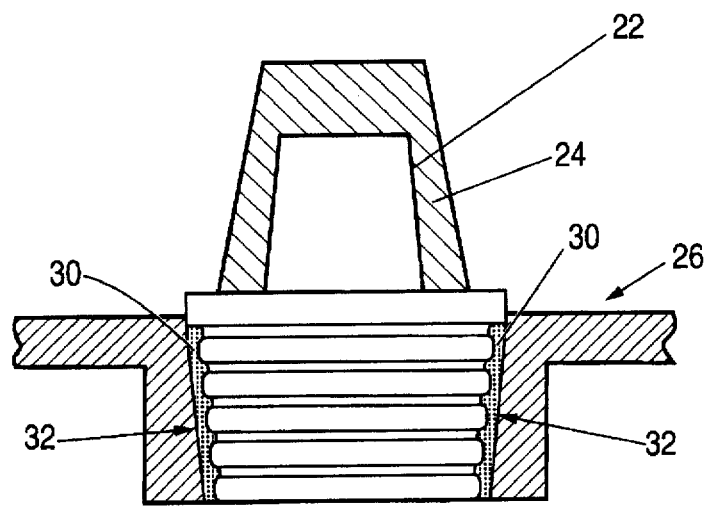
FIG. 2 is an enlarged cross sectional view of the battery terminal of the battery illustrated in FIG. 1.

Although the invention is broadly applicable to cells and batteries in general, the invention finds particular applicability in the field of lead-acid batteries, particularly normally sealed, valve regulated batteries, and flooded SLI batteries. In VRLA batteries, oxygen generated during battery operation is recombined, reforming water in the cell. For example, the invention finds utility in batteries used in motive power applications, such as automotive and marine starting, lighting, and ignition (SLI) batteries. Examples of such batteries are disclosed in U.S. Pat. Nos. 5,169,734; 5,232,796; 5,256,502; and 5,304,433. The invention also finds applicability in the field of sealed, normally stationary storage batteries, such as that disclosed in U.S. Pat. No. 5,227,266. Such batteries are used, for example, as backup power sources in the telecommunications industry.

The sealant composition of the invention comprises a sealing elastomer dissolved within a terpene solvent. With respect to the sealing elastomer, any number of elastomers are suitable for use with the present invention. It is only necessary that the sealing elastomer be capable of forming a sealing composition that may be cured to leave a coating of a sealant on an applied substrate. Suitable sealing elastomers include, for example, polyurethanes, polysilanes, polybutenes, and, most preferably, polyisobutylene. A preferred polyisobutylene is sold under the trade name OPPANOL B by BASF Corporation, Charlotte, N.C.

Other sealing elastomers will be apparent to those of ordinary skill in the art. For example, sealing elastomers that find utility in conjunction with the invention include epoxy adhesives, polyamide hot-melt adhesives, asphalts, urethanes, cyanoacrylates, tars, and so forth. The choice of sealing elastomer is not critical to the invention, and, so long as an elastomer functions in a terpene-based sealant composition to leave a coating of a sealant upon curing of the composition, the elastomer will be useful in conjunction with the invention.

Preferably, the sealant composition of the invention includes a reinforcing agent in an amount effective to reinforce the sealing elastomer upon curing of the composition. In accordance with the preferred embodiment of the invention, the reinforcing agent is a rosin compound, such as a wood rosin or a gum rosin. It has been discovered that rosins effectively enhance the adhesion strength of the sealing elastomer, thus assisting the sealing elastomer in adhering to the bushing and the substrate cover. A preferred wood rosin suitable for use in conjunction with the invention is available from Hercules Incorporated, Wilmington, Del.

Other reinforcing agents useful in conjunction with the invention include paraffins and other waxes. The choice of reinforcing agent is not critical. It is only necessary of the reinforcing agent that it be capable of strengthening the seal provided by the coating of sealing elastomer.

In accordance with the invention, the sealing elastomer is dissolved within a terpene solvent. Terpenes are a class of chemicals having a structure based on an isoprene backbone, which may be represented generally as follows:

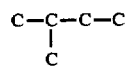

If the structure of the terpene is resolvable into two isoprene units, the terpene is referred to as a monoterpene. The solvent of the composition of the invention preferably is selected from among the monoterpenes. Preferred among the monoterpene compounds are cyclic terpenes, and especially preferred is limonene, for example, D-limonene, L-limonene, or dipentene.

In accordance with the most preferred embodiment of the invention, the solvent is D-limonene, such as that sold by Florida Chemical Co., Inc., Winter Haven, Fla. D-limonene is prepared by extraction from citrus fruits, such as lemons, limes, and oranges. Because of the natural derivation of D-limonene, it is believed to be completely non-toxic and environmentally safe. In addition, it has been surprisingly discovered that D-limonene functions effectively as a solvent for sealing elastomers such as polyisobutylene, and functions effectively in conjunction with existing processes for battery production. When used in a sealant composition, D-limonene readily evaporates upon curing of the composition to leave a coat of sealant on an applied substrate. D-limonene thus is effective to form a seal between the conductive material of the terminal bushings and the nonconductive material of the cover.

In light of the present invention, other terpene solvents will be apparent to those skilled in the art. Most preferred among the terpenes are those that are naturally derived, non-toxic, and environmentally safe.

In general, the amounts of sealing elastomer and reinforcing agent present in the composition will be dictated by the desired coating thickness of the sealant upon evaporation of the solvent, with the addition of more sealing elastomer and reinforcing agent resulting in a thicker coating. In accordance with the preferred embodiment of the invention, the sealing elastomer is present in the composition an amount ranging from about 1% to about 15% by weight, more preferably, from about 1% to about 10% by weight. The reinforcing agent preferably is present in an amount ranging from about 1% to about 15% by weight, more preferably, from about 1% to about 10% by weight. When the sealant composition is used in conjunction with, for example, a motive power battery, a coating thickness of about 0.05 mil to about 2 mil (about 0.001 mm to about 0.05 mm) is desired. It has been discovered that thicknesses in this range may be obtained if the sealing elastomer and reinforcing agent each are present in the composition in an amount form about 2% to about 3%, preferably about 2.7% by weight.

For stationary batteries, thicker coatings of sealant are often desired. The coating typically has a thickness in the range of about 0.05 mil to about 4 mil (about 0.001 mm to about 0.10 mm). It has been discovered that such a thickness may be obtained if the sealing elastomer and reinforcing agent are each present in the sealing composition in an amount of about 4.5% to about 5.5% by weight, preferably about 5% by weight.

Other ingredients may be present within the sealant composition. For example, the sealant composition may include a colorant, such as a pigment or dye. It may be desired to prepare the battery or cell such that the terminals are of different colors, so that, during processing, the terminal polarity can be identified. One or both of the positive and negative terminals may be colored. Conventionally, the positive terminal of a battery or cell is colored red, and the negative terminal is uncolored or is colored black. In accordance with the preferred embodiment of the invention, the sealant composition to be used to seal the positive terminal connector includes a red colorant. The colorant should not interfere with stability of the sealant in sulfuric acid. Suitable colorants include, for example, dyes selected from among the family of dyes known as solvent red dyes. A preferred dye is an anthraquinone dye known by the trade name Solvent Red 207 and sold under the trademark MORPLAS RED 61 by Morton International, Chicago, Ill. The dye preferably is added to the composition in an amount ranging from about 0.04% to about 0.07% by weight of the sealant composition.

Other ingredients may be added to the sealant composition. For example, it is contemplated that a stabilizer could be added in an amount effective to stabilize the composition. It is only necessary, however, that the composition include a sealing elastomer dissolved within a trepene solvent.

In accordance with the invention, a bushing is prepared for use in a sealed lead-acid battery by coating at least a portion of the exterior of the bushing with a sealant. After so coating the bushing, the composition is cured to leave a sealant coating. To minimize the processing time required to coat the bushing, the sealant composition preferably is applied in a single series of coating and curing steps. If desired, however, these steps may be repeated to render a thicker coating of sealant.

In curing of the sealant composition, the terpene solvent, which is volatile with respect to the volatility of the sealing elastomer and wood rosin, evaporates. The solvent may be evaporated by allowing the sealing elastomer to dry at ambient temperature, or the coated bushings may be heated to force evaporation of the solvent. In either case, the evaporation should continue until all or substantially all of the solvent has evaporated to leave a sealant coating. It has been observed that, in the case of D-limonene, up to about 12% residual terpene solvent often may be detected within the sealant coating. These solvent residuals have been observed not to affect the sealant function of the coating.

Figure 1:
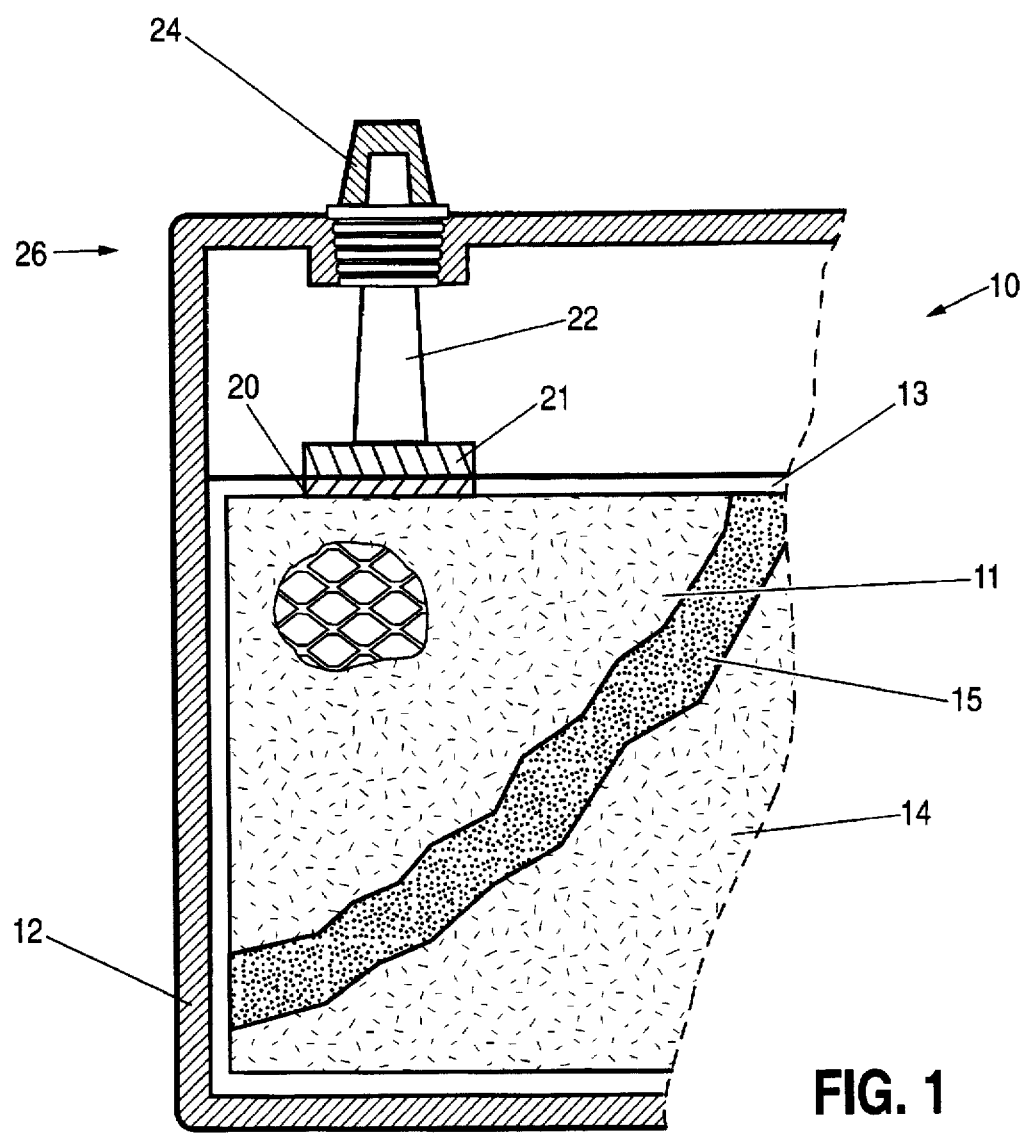
FIG. 1 is a side elevational, partial sectional and cutaway view of a battery and bushing construction in accordance with the invention.

An example of a battery made with the sealant composition of the invention is illustrated in FIGS. 1 and 2. With reference to FIG. 1, a battery 10 is comprised of a container 12 containing plurality of series-connected cells separated by partitions 13. The cells include at least one porous positive electrode plate 11, at least one porous negative electrode plate 14, a porous absorbent separator 15 interleaved between and pressed against the opposite polarity plates, and a sulfuric acid electrolyte absorbed within the porous plates and separator. Preferably, the plates are formed of lead grids upon which an active material paste has been applied. Each grid preferably is provided with an integral lug, or current collection tab 20. The collection tabs 20 on the positive plates each are joined together at a strap 21, as are the tabs on the negative plates (not shown). An integral post 22 protrudes from the strap 21 and is shaped to matingly engage a bushing 24, which is integrally disposed within the cover 26 of the battery 10 and which provides electrical communication through the cover 26. The battery container and cover may include other conventional components, such as valves, handles, and so forth (not shown), which may be assembled within the container or cover in any conventional fashion.

In accordance with the invention, the cover is formed by insert-molding the bushing for the positive and negative terminals within a non-conductive plastic substrate after the coating of sealant has been applied to the exterior of the bushings. The choice of substrate is not critical to the invention, and the substrate may be chosen from among commercially available engineering materials such as polyphenylene oxide, ABS plastics, SAN (styrene acrylonitrile) polypropylene, and other materials. The bushings are placed in an injection mold, and the nonconductive plastic substrate is injection-molded around the bushings so as to compress the sealant between the bushings and the substrate. The sealant is under compression, thus acting as a "cushion" to seal the interface between the bushings and the substrate. The cover 26 includes at least two bushings for providing electrical communication with both positive and negative electrodes within the battery.

To form a battery, the battery cover is secured to the battery container 12 such that the post extending from the strap that electrically joins the positive electrode plates (i.e., the positive post) mateably engages one of the bushings and such that the post extending from the strap that electrically joins the negative electrode plates (i.e., the negative electrode post) mateably engages the other bushing. The positive and negative bushings are then welded to the respective positive and negative terminal posts to form positive and negative battery terminals, for example, by induction-heated thermal fusion welding the post to the bushing. A cosmetic outer cover (not shown) may be placed over the cover 26 to form an exterior wall of the battery.

FIG. 2 illustrates the sealant coating 30 (thickness exaggerated) that seals the interface 32 between the bushing 24 and the cover 26. As illustrated, the sealant coating 30 preferably completely seals the interface 32 between the bushing 24 and cover 26. The wall of the bushing 24 preferably is grooved or ringed, to form a tortuous path between the interior and exterior of the battery cover, to thereby assist in preventing acid from leaking from the battery. The coating will be effective in suppressing electrolyte creepage from the battery, and will be effective in preventing oxygen from leaking into the battery.

The foregoing illustrated embodiment represents only one possible construction for the battery of the invention. Alternative constructions also fall within the scope of the invention. For example, the bushing may be disposed within the non-conductive substrate forming the battery cover and extend only partially through the cover. In such case, the bushing preferably includes an integral arm extending therefrom through the substrate for providing electrical communication through the substrate. Alternatively, the bushing may extend partially through the substrate such that the exterior surface of the bushing is exposed, and a separate terminal may be welded to the exterior surface of the bushing. The sealant composition of the invention is useful in conjunction with all of the foregoing alternative embodiments. For example, the sealant composition may be applied to any interface formed between the bushing and the plastic cover. All of the foregoing embodiments should be considered as falling within the scope of the present invention.

Thus, the general objects set forth above have been satisfied. The present invention provides a sealant composition including a terpene solvent, such as D-limonene. This non-fluorinated, non-chlorinated solvent is effective in forming a sealant composition with a sealing elastomer and reinforcing agent. Because D-limonene is a non-chlorinated, non-fluorinated chemical, and because it is non-toxic, the precautions necessary with the use of trichloroethylene may be avoided. In addition, the sealant composition has low flammability, and is compatible with existing processes for battery production.

Those of ordinary skill in the art will find many other uses for the sealant composition of the invention, particularly in conjunction with the preparation of cells and batteries, and, more particularly, in the sealing of interfaces between lead and plastic materials in such batteries. For example, the composition may find utility in sealing terminal or floater frames in a bipolar lead-acid battery. An example of such a battery is disclosed in U.S. Pat. No. 5,384,817. A bipolar battery frame includes a conductive grid within a nonconductive polymeric frame. It is expected that the sealant composition of the invention will be effective in providing a seal between the substrate and the frame. The invention will also find applicability in other batteries, for example, nickel-cadmium or nickel-metal hydride batteries. While injection molding may be used in conjunction with the invention, other methods may be used as well to prepare the container and cover.

Other uses for the sealant composition of the invention will be apparent to those skilled in the art. Therefore, while particular embodiments of the invention have been shown, it should be understood that the invention is not limited thereto since modifications may be made by those skilled in the art, particularly in light of the foregoing teachings. It is, therefore, contemplated by the appended claims to cover any such modifications as incorporate those features which constitute the essential features of these improvements within the true spirit and scope of the invention.

What is claimed is:

1. A method for making a cover for a cell or battery, the cover including a nonconductive plastic substrate having an interior surface and an exterior surface and having a first bushing disposed within said substrate for allowing electrical communication between said interior surface and said exterior surface and a second bushing disposed within said substrate for allowing electrical communication between said interior surface and said exterior surface, each of said bushings having an exterior and presenting an interface between said exterior of said bushing and said plastic substrate, the method comprising the steps of:
    (a) providing first and second bushings;
    (b) for each of said first and second bushings,
        (1) applying to at least a portion of said exterior of said bushing a curable sealant composition which comprises:
            a terpene solvent; and
            a sealing elastomer dissolved therein; and
        (2) curing said sealant composition; and
    (c) insert molding said first bushing and said second bushing into a non-conductive substrate to thereby form a cell cover, whereby said sealing elastomer forms a seal at said interfaces.

2. A cover made in accordance with the method of claim 1.

3. A method for making a cell, comprising:
    (a) providing a cell container including a compartment and having at least one positive electrode plate and at least one negative electrode plate disposed within said compartment, a separator disposed between said electrode plates, and an acid electrolyte absorbed in the electrode plates and separator, said cell container having disposed therein a positive post electrically communicating with said positive plate and a negative post electrically communicating with said negative plate;
    (b) providing a cell cover including a nonconductive plastic substrate having an interior surface and an exterior surface and having a first bushing disposed within said substrate for mateably engaging said positive post to allow electrical communication between said positive post and said exterior surface and a second bushing disposed within said substrate for mateably engaging said negative post to allow electrical communication between said negative post and said exterior surface, each of said bushings having an exterior and presenting an interface between said exterior of said bushing and said plastic substrate, said cell cover prepared by a method comprising the steps of:
        (1) providing first and second bushings,
        (2) for each of said first and second bushings,
            (i) applying to at least a portion of said exterior of said bushing a curable sealant composition which comprises:
                a terpene solvent; and
                a sealing elastomer dissolved therein; and (ii) curing said sealant composition; and (3) insert molding said first and second bushings into a non-conductive substrate to thereby form a cell cover, whereby said sealing elastomer forms a seal at said interfaces; and (c) securing said cover to said container such that said cell cover covers said compartment, whereby said first bushing mateably engages said positive post and whereby said second bushing mateably engages said negative post.

4. A method according to claim 3, further comprising the steps of:

(d) welding said first bushing to said positive post to thereby form a positive terminal; and (e) welding said second bushing to said negative post to thereby form a negative terminal.

5. A cell made in accordance with claim 3.

6. A method for making a battery, comprising:

(a) providing a battery container having partitions dividing said container into cells, each of said cells containing at least one positive and negative electrode plate, a separator disposed between adjacent positive and negative plates, and an acid electrolyte absorbed in said separator and said plates, each of said positive plates in each cell being joined by a positive strap and each of said negative plates in each cell being joined by a negative strap, the battery including a positive post disposed within said container and electrically communicating with said positive strap and a negative post disposed within said container and electrically communicating with said negative strap;

(b) providing a cell cover including a nonconductive plastic substrate having an interior surface and an exterior surface and having a first bushing disposed within said substrate for mateably engaging said positive post to allow electrical communication between said positive post and said exterior surface and a second bushing disposed within said substrate for mateably engaging said negative post to allow electrical communication between said negative post and said exterior surface, each of said bushings having an exterior and presenting an interface between said exterior of said bushing and said plastic substrate, said cell cover prepared by a method comprising the steps of:

(1) providing first and second bushings, (2) for each of said first and second bushings, (i) applying to at least a portion of said exterior of said bushing a curable sealant composition which comprises:

a terpene solvent; and a sealing elastomer dissolved therein; and (ii) curing said sealant composition; and (3) insert molding said first and second bushings into a non-conductive substrate to thereby form a cover, whereby said sealing elastomer forms a seal at said interfaces; and (c) securing said cover to said container such that said cell cover covers said compartment, whereby said first bushing mateably engages said positive post and whereby said second bushing mateably engages said negative post.

7. A method according to claim 6, further comprising the steps of:

(d) welding said first bushing to said positive post to thereby form a positive terminal; and (e) welding said second bushing to said negative post to thereby form a negative terminal.

8. A battery made in accordance with claim 6.

9. A cell comprising:

a container including a compartment;

at least one positive electrode plate and at least one negative electrode plate disposed within said compartment;

a separator disposed between said positive and negative plates;

an acid electrolyte absorbed within said separator and plates;

a positive post electrically communicating with said positive electrode plate and a negative post electrically communicating with said negative electrode plate;

a cover comprising:

a nonconductive plastic substrate;

first and second bushings disposed within said substrate, each of said bushings having an exterior and presenting an interface between said exterior of said bushing and said plastic substrate, said first bushing electrically communicating with said positive post and said second bushing electrically communicating with said negative post;

a sealant forming a seal at said interfaces which comprises:

a coating of a sealing elastomer about the exterior of each bushing at each interface, and residue of a terpene solvent disposed within said coating.

10. A battery comprising:

a container having partitions dividing said container into cells, each of said cells containing at least one positive and negative plates, a separator disposed between adjacent positive and negative plates, and an acid electrolyte absorbed in said separator and said plates, each of said positive electrode plates being joined by a positive strap and each of said negative electrode plates being joined by a negative strap;

a positive post electrically communicating with said positive strap and a negative post electrically communicating with said negative strap;

a cover comprising:

a nonconductive plastic substrate;

first and second bushings disposed within said substrate, said first bushing electrically communicating with said positive post and said second bushing electrically communicating with said negative post, each of said bushings having an exterior and presenting an interface between said exterior of said bushing and said plastic substrate; and a sealant forming a seal at said interfaces which comprises:

a coating of a sealing elastomer about the exterior of each bushing at each interface, and residue of a terpene solvent disposed within said coating.

11. A battery according to claim 10, said interface presenting a tortuous path through said cover.

* * * * *